United States Patent [19]

Fujikawa

[11] Patent Number: 4,611,850

[45] Date of Patent: Sep. 16, 1986

[54] CLIP DEVICE FOR FIXING WINDOW GLASS IN MOTOR VEHICLE

[75] Inventor: Yoshihiro Fujikawa, Toyota, Japan

[73] Assignee: Toyota Jidosha Kabushiki Kaisha, Japan

[21] Appl. No.: 680,661

[22] Filed: Dec. 12, 1984

[30] Foreign Application Priority Data

Dec. 14, 1983 [JP] Japan ............... 58-192644[U]

[51] Int. Cl.[4] ............................................. B60J 1/02
[52] U.S. Cl. ..................................... 296/201; 296/146; 296/206; 52/208; 52/489; 52/716; 52/717.1; 403/406.1
[58] Field of Search ............. 296/200, 201, 146, 84 R, 296/84 A, 206, 93; 52/489, 488, 716, 717, 718, 208; 403/406 X

[56] References Cited

U.S. PATENT DOCUMENTS

| | | | |
|---|---|---|---|
| 4,168,858 | 9/1979 | Inamoto | 296/84 R |
| 4,251,101 | 2/1981 | Aotani | 296/93 |
| 4,389,068 | 6/1983 | Sengoku | 296/206 |
| 4,487,448 | 12/1984 | Aotani | 296/93 |

FOREIGN PATENT DOCUMENTS

| | | |
|---|---|---|
| 55-106109 | 1/1979 | Japan . |
| 56-136811 | 3/1980 | Japan . |
| 57-141113 | 2/1981 | Japan . |
| 58-54315 | 4/1983 | Japan . |
| 58-135310 | 9/1983 | Japan . |

Primary Examiner—Robert R. Song
Attorney, Agent, or Firm—Finnegan, Henderson, Farabow, Garrett & Dunner

[57] ABSTRACT

A clip device for fixing a window glass in a motor vehicle comprises a body side clip secured to the vehicle body at a position adjacent an outer peripheral edge of the window glass, a screw threadably coupled to the body side clip, a clip body fixed to the body side clip by means of the screw and having a forward end portion extending away from the screw for pressing the outer peripheral edge of the window glass, and a retainer tightened and fixed together with the clip body to the body side clip by means of the screw from the outside of the clip body. The forward end portion of the clip body is formed into a thin wall projection, and the forward end portion of said retainer is brought into contact with the outer surface of the forward end portion of the clip body and extends away from the screw and toward the center of the window glass farther than the forward end portion of the body. The window glass is pressed toward the vehicle body by means of the forward end portion of the retainer. The moulding can be secured to the forward end portion of said retainer, and end faces of the clip body and retainer underlying the head portion of the screw are offset inwardly toward the vehicle body relative to the forward end portions of the clip body and the retainer to reduce the overall height of the clip device and minimize air resistance.

9 Claims, 4 Drawing Figures

CLIP DEVICE FOR FIXING WINDOW GLASS IN MOTOR VEHICLE

BACKGROUND OF THE INVENTION

1. Field of the Invention

This invention relates to a clip device for fixing a window glass in a motor vehicle, and more particularly to improvements in a clip device for fixing a window glass in a motor vehicle, having a moulding covering the outer surface of a clip assembly comprising a body side clip solidly secured to the vehicle body at a position adjacent an outer perpheral edge of the window glass, and a clip body tightened and fixed to the body side clip by means of a screw and having a forward end portion for pressing the outer peripheral edge of the window glass.

2. Description of the Prior Art

As has been seen in many publications such as, for example, in Japanese Utility Model Laid Opens Nos. 58-54,315, 58-135,310, 57-141,113, 56-136,811 and 55-106,109, there has been proposed a clip device for fixing a window glass in a motor vehicle.

Further, as shown in FIGS. 3 and 4, as the conventional clip device for fixing a window glass in a motor vehicle of this type, there has been one having a moulding 8 covering the outer surface of a clip assembly 10 comprising: a body side clip 4 solidly secured to the vehicle body 3 at a position adjacent an outer peripheral edge 2A of a window glass 2 in a motor vehicle 1; a screw 5 threadably coupled to the body side clip 4; a clip body 6 tightened and fixed to the body side clip 4 by means of the screw 5 and having a forward end portion 6A for pressing the outer peripheral edge 2A of the window glass 2; and a retainer 7 tightened and fixed together with the clip body 6 to the body side clip 4 by means of the screw 5 from the outside of the clip body 6.

Referring to FIG. 4, designated at 9 is an pressure-sensitive form sealer interposed between the inner surface of the outer peripheral edge 2A of the window glass and the vehicle body 3, for sealing a space formed therebetween, at 11 a hole formed in the vehicle body 3, into which the body side clip 4 is coupled, at 12 a seal interposed between the clip body 6 and the vehicle body 3 around the hole 11, for sealing a space formed therebetween and preventing water leakage through the hole 11, and at 13 a seal secured to an end portion of the moulding 8, for contacting the outer surface of the window glass 2 to seal a space formed therebetween.

In the conventional clip device for fixing a window glass in a motor vehicle as described above, since the clip body 6 substantially presses the outer peripheral edge of the window glass 2 through the forward end portion 6A thereof, a considerably high mechanical strength is required from the forward end portion 6A, and hence, the forward end portion 6A is formed to have a considerable thickness meeting the requirement of this mechanical strength.

Furthermore, the moulding 8 is engaged with projections 6B and 6C projecting from, respectively, the left and right end portions of the clip body 6, as shown in the FIG. 4, and adapted to cover the outer surface of the clip assembly 10.

In consequence, the height of this moulding 8 measured from the surface of the window glass 2, i.e., a difference in stage H, must be sufficient for covering a sum of the thickness of the forward end portion 6A of the clip body 6 from the surface of the window glass 2, the thickness of the retainer 7 and the thickness of the head 5A of the screw 5.

When irregularities on the outer surface of the motor vehicle are minimized, i.e., a flush surface is adopted so as to reduce the air resistance during movement of the motor vehicle at high speed, the difference in stage H has been disadvantages in that it serves as one of causes of the increasing the air resistance.

SUMMARY OF THE INVENTION

It is therefore the primary object of the present invention to provide a clip device for fixing a window glass in a motor vehicle, wherein the height of the moulding protruding from the outer surface of the window glass is decreased, so that the air resistance during running of the motor vehicle at high speed can be reduced.

To this end, the present invention contemplates that, in a clip device for fixing a window glass in a motor vehicle, having a moulding covering the outer surface of a clip assembly comprising: a body side clip solidly secured to the vehicle body at a position adjacent an outer peripheral edge of the window glass; a screw threadably coupled to the body side clip; a clip body tightened and fixed to the body side clip by means of the screw and having a forward end portion extending away from the screw for pressing the outer peripheral edge of the window glass; and a retainer tightened and fixed together with the clip body to the body side clip by means of the screw from the outside of the clip body; the forward end portion of the clip body is formed into a thin wall projection, and the forward end portion of the retainer is brought into contact with the outer surface of the forward end portion of the clip body and extends away from the screw and toward the center of the window glass farther than the forward end portion of the clip body, whereby the window glass is pressed toward the vehicle body by means of the forward end portion of the retainer, the moulding can be secured to the forward end portion of the retainer, and end faces of the clip body and the retainer to be tightened by means of the screw are offset inwardly toward the vehicle body with respect to the forward end portions of the clip body and the retainer.

To the above end, the present invention contemplates that said retainer is substantially crank-shaped from a tightened end face to said forward end portion, and the clip body is formed into a substantially crank-shape in cross section from a tightened end face as being the top end face thereof to the forward end portion, so that the both tightened end faces can be offset inwardly toward the vehicle body with respect to the outer surface of the window glass.

To the above end, the present invention contemplates that a sum of the heights of the clip body, the body side clip and the screw measured in a direction of the thickness of the window glass is shortened by a value equal to an offset value e of the crank in the retainer and the clip body.

To the above end, the present invention contemplates that the forward end portion of the clip body is formed with a recess for receiving the forward end portion of the retainer, whereby the undersurface and both side edges of the forward end portion of the retainer are surrounded by the forward end portion of the clip body, so that these undersurface and side edges are prevented from directly contacting the outer surface of the window glass and the retainer is maintained in a desired positional relationship with the clip body.

To the above end, the present invention contemplates that the outer surface of the moulding is substantially in parallel with the window glass, and that the moulding is engaged at one end portion thereof with a projection of the clip body, and is engaged at another end portion having a U-shape with the forward end portion of the retainer, so as to cover the outer surface of the clip assembly.

DETAILED DESCRIPTION OF THE PREFERRED EMBODIMENT

Description will hereunder be given of one embodiment of the present invention with reference to the drawings.

Figure 4:
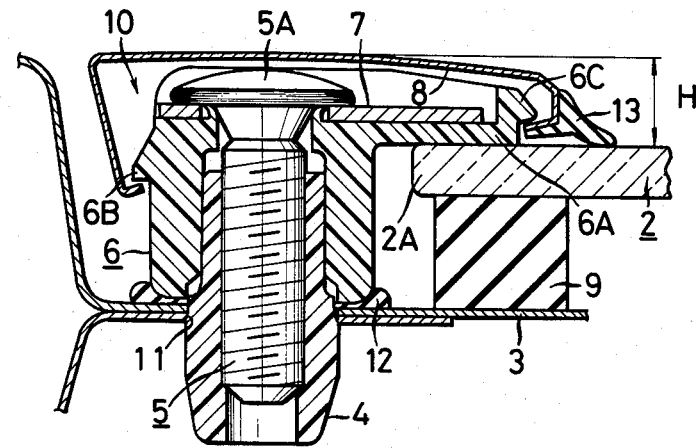
FIG. 4 is an enlarged sectional view taken along the line IV—IV in FIG. 3.

In this embodiment, the same reference numerals as in FIG. 4 are used to designate parts that are the same as or similar to corresponding ones in the conventional clip device for fixing a window glass in a motor vehicle as shown in FIG. 4, so that the detailed description of those parts need not be repeated.

Figure 1:
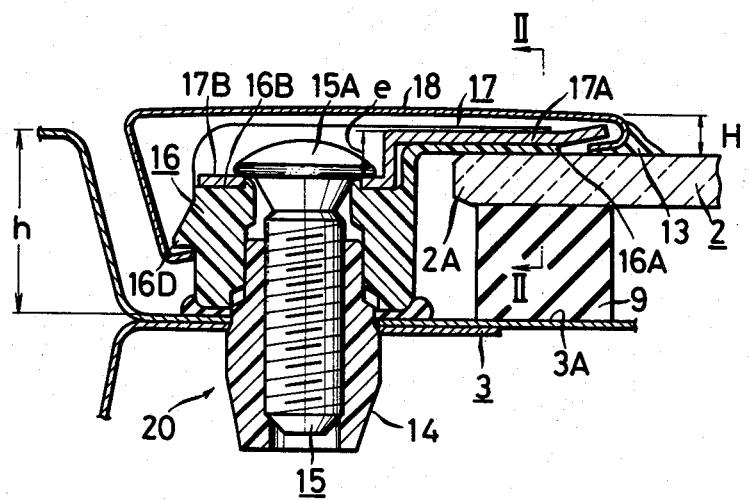
FIG. 1 is a sectional view showing the embodiment of the clip device for fixing the window glass in a motor vehicle according to the present invention.
Figure 2:
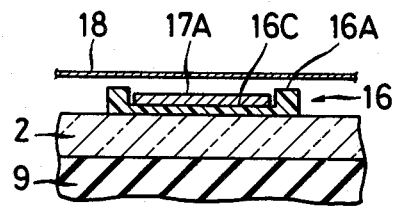
FIG. 2 is a sectional view taken along the line II—II in FIG. 1.
Figure 3:
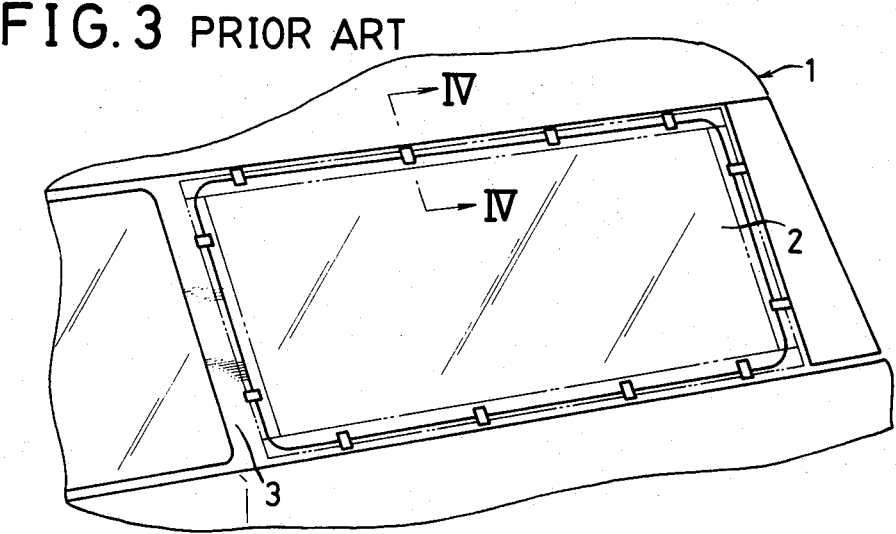
FIG. 3 is a perspective view showing the essential portions of the motor vehicle, to which is applied the conventional clip device for fixing the window glass in a motor vehicle.

According to this embodiment, as shown in FIGS. 1 and 2, the clip device of this invention for fixing a window glass in a motor vehicle includes a clip assembly 20 having a moulding 8 covering the outer surface thereof. Clip assembly 20 comprises a body side clip 14 solidly secured to a vehicle body 3 at a position adjacent an outer peripheral edge 2A of the window glass 2, a screw 15 threadably coupled to the body side clip 14, and a clip body 16 tightened and fixed to the body side clip 14 by means of the screw 15 and having a forward end portion 16A extending away from the screw 15 for pressing the outer peripheral edge 2A of the window glass 2. Clip assembly 20 further comprises a retainer 17 tightened and fixed together with the clip body 16 to the body side clip 14 by means of the screw 15 from the outside of the clip body 16. The forward end portion 16A of the clip body 16 is formed into a thin wall projection that overlies the outer peripheral edge of the window glass 2, and the forward end portion 17A of the retainer 17 is brought into contact with the outer surface of the forward end portion 16A of the clip body 16 and extends away from the screw 15 and toward the to the center of the window glass 2 farther than the forward end portion 16A of the clip body 16. Consequently, the window glass 2 is pressed toward the vehicle body 3 by means of the forward end portion 17A of the retainer. The moulding 18 can be secured to the forward end portion 17A of the retainer, and end faces 16B and 17B of the clip body 16 and the retainer 17 to be tightened by means of the screw 15 are offset inwardly toward the vehicle body 3 with respect to the forward end portions 16A and 17A of the clip body 16 and the retainer 17.

More specifically, the retainer 17 is bent in a substantially crank-shape from the tightened end face 17B to the forward end portion 17A, and the clip body 16 is formed into a substantially crank-shape in cross section from the tightened end face 16B as being the top end face thereof to the forward end portion 16A, so that the both tightened end faces 17B and 16B can be offset inwardly toward the vehicle body 3 with respect to the outer surface of the window glass 2.

In accordance with the above, the sum H of the heights of the clip body 16, the body side clip 14 and the screw 15 in the direction of the thickness of the window glass 2 is shortened by a value equal to an offset value e of the crank in the retainer 17 and the clip body 16 as compared with the aforesaid height in the prior art.

As shown in FIG. 2 the cross section of the forward end portion 16A of the clip body 16 is formed with a recess 16C for receiving the forward end portion 17A of the retainer 17, whereby the undersurface and both right and left side edges in the drawing of the forward end portion 17A of the retainer are surrounded by the forward end portion 16A of the clip body 16, so that these undersurface and side edges are prevented from directly contacting the outer surface of the window glass 2 and the retainer 17 is maintained in a desired positional relationship with the clip body 16.

The outer surface of the moulding 18 is substantially parallel to the window glass 2. The moulding 18 is engaged at one end portion with a projection 16D of the clip body 16, and another end portion of the moulding is U-shaped and is engaged with the forward end portion 17A of the retainer 17, so as to cover the outer surface of the clip assembly 20.

In this embodiment, the retainer 17 is adapted to substantially press the outer peripheral edge 2A of the window glass 2 through the forward end portion 17A thereof, and the forward end portion 16A of the clip body 16 is interposed between the forward end portion 17A of the retainer 17 and the outer surface of the outer peripheral edge 2A of the window glass 2, to thereby additionally perform functions of protecting the outer surface of the window glass 2 and of holding the retainer 17.

Furthermore, the retainer 17 presses the window glass 2 through the forward end portion 17A thereof and additionally performs a fuction of holding the moulding 18.

Consequently, in this embodiment, the forward end portion 16A of the clip body may be sufficient in use, only if it is interposed between the forward end portion 17A of the retainer 17 and the window glass 2, for preventing the both members from directly contacting each other. In consequence, the forward end portion 16A should be of a very thin wall thickness.

For this reason, a sum of the thicknesses of the forward end portion 16A of the clip body 16 and the forward end portion 17A of the retainer 17 can be made considerably thin as compared one in the prior art.

Further, in this embodiment, the tightened end faces 16B and 17B of the clip body 16 and the retainer 17 are offset inwardly toward the vehicle body with respect to the forward end portions 16A and 17A of the clip body 16 and the retainer 17 in addition to that the forward end portion 16A of the clip body 16 is reduced in the wall thickness thereof, whereby the head 15A of the screw 15 for tightening and fixing the tightened end faces 16B and 17B to the vehicle body 3 does not protrude outwardly from the forward end portion 17A of the retainer 17, as shown in the drawing. In consequence, the difference in stage H between the outer surfaces of the moulding 18 and the window glass 2 is determined by the sum of the thicknesses of the forward end portion 16A of the clip body 16, the forward end portion 17A of the retainer 17, and the moulding 18, so that the difference in stage H in this embodiment can be considerably reduced as compared with the case of the conventional clip device for fixing the window glass as shown in FIG. 4.

Additionally, a difference in stage h between a surface 3A of the vehicle body 3, for mounting the window glass 2, and the general surface therearound can be reduced as compared with the case in the prior art as shown in FIG. 4.

Furthermore, in this embodiment, the outer peripheral edge 2A of the window glass 2 is pressed and the moulding 18 is held by the retainer 17 formed of a metallic material of a high rigidity in general such as steel, so that a satisfactory strength for pressing the window glass and a strength for holding the moulding 18 are obtainable.

In the above embodiment, the forward end portion 17A of the retainer 17 is coupled into the recess 16C formed in the forward end portion 16A of the clip body 16, whereby the desired positional relationship between the retainer 17 and the clip body 16 is maintained. However, the present invention need not necessarily be limited to this, and, there is no need of forming the recess 16C if any other means is adopted which can substantially maintain the positional realationship therebetween.

What is claimed is:

1. A clip device for fixing a window glass to a motor vehicle body, comprising:
    a body side clip secured to said motor vehicle body adjacent an outer peripheral edge of said window glass;
    a screw threadably coupled to said body side clip, said screw including a head portion;
    a clip body having an aperture for receiving said screw and being fixed to said body side clip by said screw, said clip body including a clip body forward end portion extending away from said screw and overlying the outer surface of said window glass at said outer peripheral edge, said clip body further including a clip body end face underlying said head portion of said screw, said clip body end face being offset inwardly toward said motor vehicle body relative to said clip body forward end portion;
    a retainer overlying said clip body, having an aperture for receiving said screw, and being fixed to said clip body and said body side clip by said screw, said retainer including a retainer forward end portion contacting the outer surface of said clip body forward end portion and extending away from said screw farther than said clip body forward end portion, said retainer further including a retainer end face underlying said head portion of said screw, said retainer end face being offset inwardly toward said motor vehicle body relative to said retainer forward end portion, said retainer forward end portion pressing said clip body forward end portion and said window glass toward said motor vehicle body when said screw is tightened; and
    a moulding covering the outer surfaces of said retainer, said clip body, and said head portion of said screw, said moulding having one end portion secured to said retainer forward end portion.

2. The clip device of claim 1, wherein said retainer is substantially crank-shaped in cross-section from said retainer end face to said retainer forward end portion, said clip body is substantially crank-shaped in cross section from said clip body end face to said clip body forward end portion, and said end faces are offset inwardly toward said vehicle body relative to said outer surface of said window glass.

3. The clip device of claim 1, wherein said clip body forward end portion includes a recess for receiving said retainer forward end portion, said recess preventing the undersurface and side edges of said retainer forward end portion from directly contacting said outer surface of said window glass and maintaining the positional relationship of said retainer with said clip body.

4. The clip device of claim 2, wherein said clip body forward end portion includes a recess for receiving said retainer forward end portion, said recess preventing the undersurface and side edges of said retainer forward end portion from directly contacting said outer surface of said window glass and maintaining the positional relationship of said retainer with said clip body.

5. The clip device of claim 1, wherein said clip body includes a moulding projection on the side of said screw opposite said clip body forward end portion, the outer surface of said moulding is substantially parallel to said window glass, said one end portion of said moulding is U-shaped and engaged with said retainer forward end portion, and said moulding includes another end portion engaged with said moulding projection of said clip body.

6. The clip device of claim 2, wherein said clip body includes a moulding projection on the side of said screw opposite said clip body foward end portion, the outer surface of said moulding is substantially parallel to said window glass, said one end portion of said moulding is U-shaped and engaged with said retainer forward end portion, and said moulding includes another end portion engaged with said moulding projection of said clip body.

7. The clip device of claim 3, wherein said clip body includes a moulding projection on the side of said screw opposite said clip body foward end portion, the outer surface of said moulding is substantially parallel to said window glass, said one end portion of said moulding is U-shaped and engaged with said retainer forward end portion, and said moulding includes another end portion engaged with said moulding projection of säid clip body.

8. The clip device of claim 4, wherein said clip body includes a moulding projection on the side of said screw opposite said clip body foward end portion, the outer surface of said moulding is substantially parallel to said window glass, said one end portion of said moulding is U-shaped and engaged with said retainer forward end portion, and said moulding includes another end portion engaged with said moulding projection of said clip body.

9. A clip device for fixing a window glass to a motor vehicle body, comprising:
    a body side clip secured to said motor vehicle body adjacent an outer peripheral edge of said window glass;
    a screw threadably coupled to said body side clip, said screw including a head portion;

a clip body having an aperture for receiving said screw and being fixed to said body side clip by said screw, said clip body including a clip body forward end portion extending away from said screw and overlying the outer surface of said window glass at said outer peripheral edge, said clip body further including a clip body end face underlying said head portion of said screw, said clip body end face being offset inwardly toward said motor vehicle body relative to said clip body forward end portion; and a retainer overlying said clip body, having an aperture for receiving said screw, and being fixed to said clip body and said body side clip by said screw, said retainer including a retainer forward end portion contacting the outer surface of said clip body forward end portion and extending away from said screw farther than said clip body forward end portion, said retainer further including a retainer end face underlying said head portion of said screw, said retainer end face being offset inwardly toward said motor vehicle body relative to said retainer forward end portion, said retainer forward end portion pressing said clip body forward end portion and said window glass toward said motor vehicle body when said screw is tightened.

* * * * *